United States Patent
Brener et al.

(10) Patent No.: US 6,411,757 B1
(45) Date of Patent: Jun. 25, 2002

(54) ARTICLE COMPRISING A WAVEGUIDE STRUCTURE WITH IMPROVED PUMP UTILIZATION

(75) Inventors: Igal M. Brener, Eatontown; Gadi Lenz, Fanwood; Joseph Shmulovich, Murray Hill, all of NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/503,378

(22) Filed: Feb. 14, 2000

(51) Int. Cl.⁷ .............................. G02B 6/26; H01S 3/091
(52) U.S. Cl. ....................... 385/43; 385/129; 359/341.1; 359/341.3; 372/70
(58) Field of Search ................................. 382/129, 131, 382/132, 43; 359/341, 343; 372/6, 50, 75

(56) References Cited

U.S. PATENT DOCUMENTS

| | | | |
|---|---|---|---|
| 5,263,036 A | * | 11/1993 | De Barnardi et al. |
| 5,539,571 A | * | 7/1996 | Welch et al. ................. 359/344 |
| 5,617,244 A | * | 4/1997 | Percival et al. |
| 5,703,897 A | * | 12/1997 | Welch et al. ................. 372/50 |
| 5,861,981 A | * | 1/1999 | Jabr |
| 5,864,574 A | * | 1/1999 | Welch et al. ................. 372/50 |
| 5,872,804 A | * | 2/1999 | Kan et al. |
| 5,982,973 A | * | 11/1999 | Yan et al. .................... 385/141 |
| 6,014,396 A | * | 1/2000 | Osinski et al. ................ 372/46 |
| 6,324,326 B1 | * | 11/2001 | Dejneka et al. .......... 359/341.1 |

OTHER PUBLICATIONS

M.H. Chou et al., "1.5–μm–Band Wavelength Conversion Based on Cascaded Second–Order Nonlinearity in LiNbO₃ Waveguides", IEEE Photonics Technology Letters, vol. 11, No. 6, Jun. 1999, pp. 653–655.*

* cited by examiner

*Primary Examiner*—Hemang Sanghavi
*Assistant Examiner*—Omar Rojas, Jr.
(74) *Attorney, Agent, or Firm*—Lowenstein Sandler PC

(57) ABSTRACT

A waveguide structure for use with a pump laser is disclosed that is designed to counteract the decrease in pump power density. The waveguide structure may comprise an erbium-doped waveguide amplifier, a nonlinear waveguide wavelength converter device, or an optical fiber. The waveguide structure has a waveguide region that is tapered over a pump propagation distance, said distance being defined as a predetermined distance between a first pump site and a second pump site over which the pump light is propagated for signal amplification or conversion. The taper reduces the depletion in pump power as compared with prior art systems and may be kept substantially constant over the pump propagation length, thereby counteracting pump depletion.

18 Claims, 4 Drawing Sheets

ARTICLE COMPRISING A WAVEGUIDE STRUCTURE WITH IMPROVED PUMP UTILIZATION

FIELD OF THE INVENTION

The present invention relates to a waveguide structure for use with a pump laser that is designed to counteract pump depletion. The waveguide structure may comprise an erbium-doped waveguide amplifier, a nonlinear waveguide wavelength converter device, or an optical fiber, and is particularly useful in communications systems and wavelength conversion applications.

BACKGROUND OF THE INVENTION

Optical communications systems are useful for transmitting optical signals over long distances at high speeds. An optical signal, which comprises a series of light pulses, is transmitted from a light source, e.g., a laser, to a waveguide and ultimately to a detector. Optical communications systems typically include a variety of devices (e.g., light sources, photodetectors, switches, optical fibers, amplifiers, filters, and so forth). Amplifiers and filters may be used to propagate the light pulses along the length of the waveguide from the light source to the detector. Recently, demand has been increasing for the efficient, large-scale manufacturing of hybrid integrated opto-electronic devices. There is particular interest in the integration of multiple components onto a single chip and hybridization of various components into a single package.

Waveguide structures and optical fibers transmit light signals with use of internal reflection. Basically, an optical waveguide structure comprises an inner or core region fabricated from a material having a certain index of refraction, and an outer region contiguous the core comprised of a material having a lower index of refraction than the core. As long as the refractive index of the core exceeds that of the outer region, a light beam propagated along the core will be guided along the length of the waveguide. Planar waveguides are flat structures that guide light in essentially the same way as optical fibers. Essentially a planar waveguide structure comprises a strip of material embedded in a substrate where the waveguide strip has a relatively high index of refraction relative to the substrate. Thus, light is guided along the high-index waveguide strip, although the strip may not be entirely surrounded by a lower refractive index material, as the waveguide strip may be exposed to a top layer of air. One or more amplifying systems may be disposed along the waveguide transmission path for amplifying the transmitted signal.

An inefficiency inherent in the operation of opto-electronic devices pertains to depletion of pump light used in devices such as waveguide amplifiers and other optically pumped waveguides such as parametric wavelength converters. A waveguide that operates as an amplifier or a nonlinear wavelength conversion device requires the presence of a pump laser. The pump laser enables the process of amplifying or converting the optical signals. For example, FIG. 1 schematically shows an amplifier utilizing an optical fiber 11. A weak optical signal $I_s$ enters from the left, passes through an optical isolator 12 and a filter 13 that blocks pump light and transmits the signal wavelength. The light enters a doped fiber 11, typically a rare-earth doped fiber. The amplifier is then illuminated with light from the pump laser 15 which introduces a pump signal $P_s$ to the fiber to excite the dopant atoms, raise them to a higher energy level, and amplify the weak input signal $I_s$ to amplified signal As transmitted through the waveguide. A coupler 16 at the end of the amplifier routes the amplified signal to the output fiber, separating it from the pump light, to produce output signal $O_s$. Notably, although in FIG. 1 the pump laser 15 is shown at the distal end of the waveguide amplifier adjacent the output, light can be pumped into the amplifier adjacent the input, following the direction of the amplified signal $A_s$.

In any case, once the pump light is launched into the waveguide, the pump laser field gets absorbed as a function of propagation distance in a linear or nonlinear fashion. This absorption produces pump-depletion as a function of propagation distance. The depletion in turn implies a lower efficiency for the amplification or conversion process due to a reduction in pump power density in the waveguide at distances from the pump laser.

As may be appreciated, those involved in the field of communications systems and electro-optical devices continue to seek to develop new designs to improve device efficiency and performance. In particular, it would be advantageous to have a waveguide structure that results in near constant or less of a reduction in pump power density along the waveguide. These and further advantages are provided by this invention which may appear more fully upon considering the description given below.

SUMMARY OF THE INVENTION

Summarily described, the invention embraces an article including a waveguide structure for use with a pump light source, e.g., a pump laser, that preserves pump power density. The waveguide structure comprises a waveguide region having a first index of refraction, and a second region having a second index of refraction contiguous the waveguide region, wherein the second index of refraction is lower than the first index of refraction so that light launched into the waveguide structure is guided within the waveguide region. Additionally, the waveguide region has a pump propagation length which is defined as a select distance between a first pump site and a second pump site and over which pump light is transmitted within the waveguide region for signal amplification or conversion. The effective area of the waveguide region is substantially larger at the first pump site than at the second pump site and thus, the waveguide region is tapered over the pump propagation length, thereby reducing the depletion of pump power density. The waveguide structure may comprise a planar waveguide or an optical fiber.

BRIEF DESCRIPTION OF THE DRAWINGS

For a better understanding of the invention, an exemplary embodiment is described below, considered together with the accompanying drawings, in which.

It is to be understood that these drawings are for the purposes of illustrating the concepts of the invention and are not to scale.

DETAILED DESCRIPTION OF THE INVENTION

With this invention, a waveguide structure is provided that counteracts the reduction in pump power density. The waveguide structure is adapted for use in a system comprising a pump source and a signal source for simultaneously launching pump and transmission optical fields, respectively, into the waveguide structure; a coupler for combining the pump and the transmission optical fields; and one or more filters, amplifiers, receivers, spectrum analyzers, or other optical components. The term "transmission optical field" is used herein to distinguish the light transmitted in the waveguide structure from the pump (laser field) used for amplification or conversion. The waveguide structure has a waveguide region along which the pump and transmission optical fields are guided. Additionally, the waveguide region has a pump propagation length defined as a select distance between a first pump site and a second pump site over which pump light is transmitted within the waveguide region for signal amplification or conversion. The effective area, e.g., width, of the waveguide region is substantially larger at the first pump site than at the second pump site and thus, the waveguide region is tapered over the pump propagation length, thereby counteracting the depletion of pump light.

The first and second pump sites can be located at various points along the length, of the waveguide while still carrying out the inventive concepts. For example, the first pump site may be the point at which pump light is introduced into the waveguide region from the pump source, but it also may comprise a point inward of the waveguide region (e.g., a point at which the depletion of pump light raises concern). Also, the first pump site may be at or proximal the point at which the transmission optical field is introduced into the waveguide structure (i.e., defined herein as the "transmission input site"). Alternatively, the first pump site may be distal the transmission input site, with the second pump site being closer to the transmission input site than the first pump site. As may be appreciated, many alternative embodiments are contemplated, with the important consideration being that the effective area of the waveguide region is reduced, e.g., a taper is introduced, over a length of the waveguide for which pump fields are propagated for amplification or conversion. Due to this taper, the decrease in pump power density is reduced as compared with prior art systems, and preferably is kept substantially constant over the pump propagation length, thereby counteracting pump depletion, due to absorption and losses.

Figure 1:
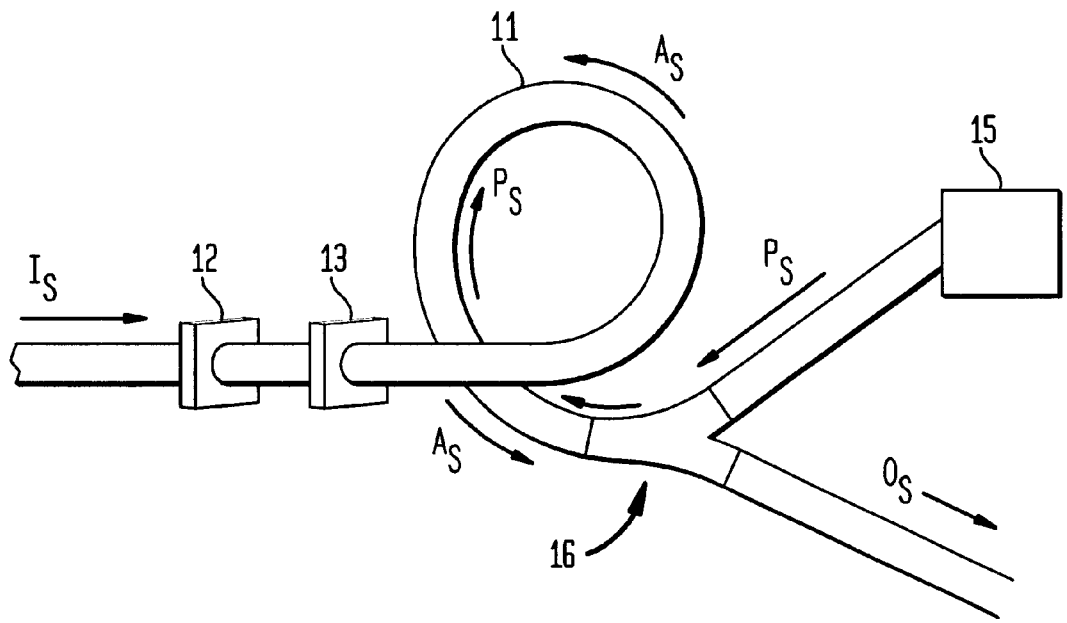
FIG. 1 is a schematic illustration of a prior art waveguide amplifier and pump laser assembly.
Figure 2:
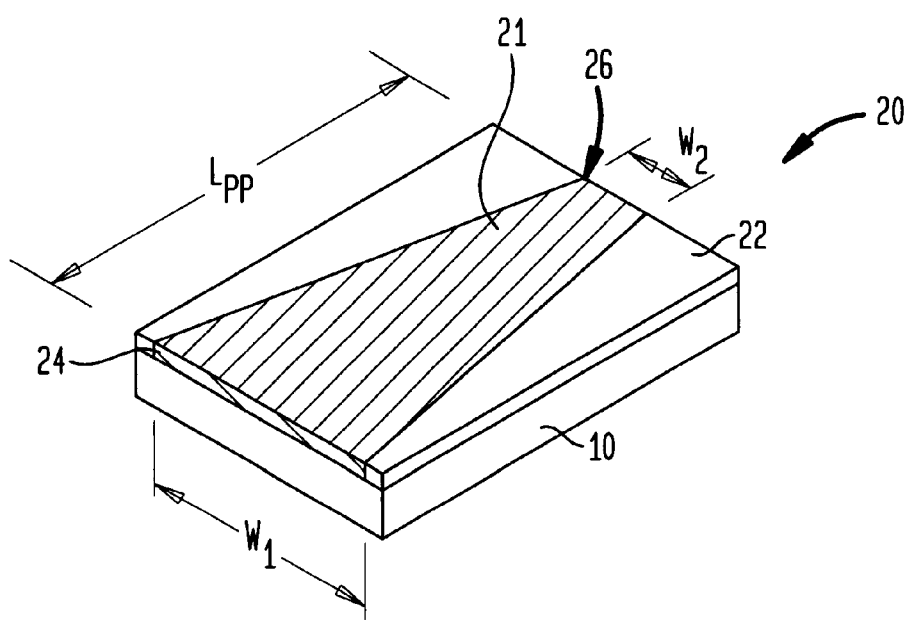
FIG. 2 is a schematic perspective view of one embodiment of the inventive waveguide structure.
Figure 2A:
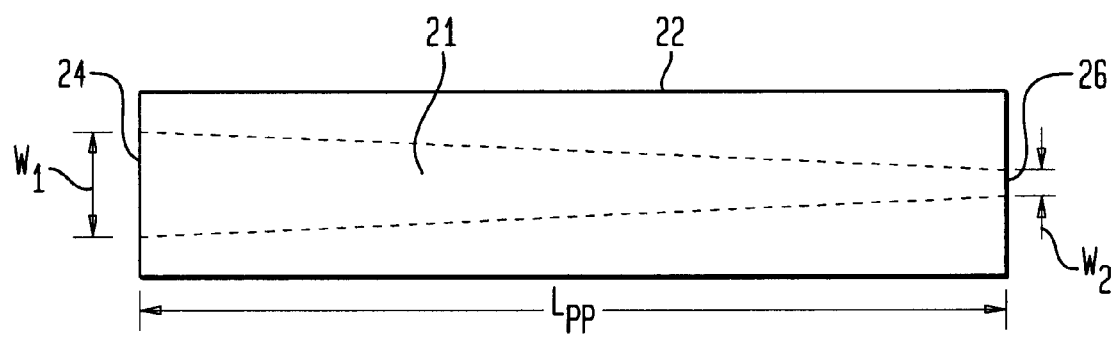
FIG. 2A is a schematic top plan view of a second embodiment of the inventive waveguide structure.

More specifically with reference to the figures, FIG. 2 schematically illustrates an exemplary embodiment of the inventive waveguide structure 20 comprising a waveguide region 21 and a contiguous or second region 22. In this embodiment the waveguide structure comprises a planar waveguide deposited on a substrate 10, such that the waveguide region 21 is not completely surrounded by the second region 22, but also is exposed to air at the top of the structure. Air has a lower refractive index ($n_f$~1.0) than the waveguide region (typically~1.46). The waveguide structure has a pump propagation length ($L_{pp}$) defined as a select distance between a first pump site 24 and a second pump site 26 over which pump light is transmitted within the waveguide region for amplification or conversion. As can be seen, the effective area, e.g., width, of the waveguide region is substantially larger at the first pump site 24 than at the second pump site 26 and consequently, the waveguide region is tapered over the pump propagation length. In operation, in this embodiment the pump light will be introduced into the waveguide region from the pump source at the first pump site, as this site is located at the edge of the waveguide structure. With this embodiment, the transmission optical field may be introduced into the waveguide structure at either the first or second pump sites 24, 26. Notably, although FIG. 2 shows a planar waveguide, these same inventive concepts can be applied to an optical fiber used as a waveguide, e.g., as illustrated in FIG. 1, where the core of the fiber comprises the waveguide region 21 and a cladding surrounds the core to define the contiguous second region 22.

Optimally, the pump power is maintained constant over a given length of the waveguide region, i.e., there is no decay in pump brightness. This can be expressed as $D_p = p(z)/A_{eff}$, where DP is the pump density, p(z) is the pump power at a given distance (z) along the waveguide, z is a given distance at which the pump light has traveled within the waveguide region, and $A_{eff}$ is the effective area of the mode. $D_p$ is preferably kept constant, but the pump power is a function of propagation distance and will decrease with increases in z. Thus, to achieve a constant value for the pump power, the value for $A_{eff}$ should decrease with decreases in the pump power p(z) and preferably be as small as possible. This means that to achieve a constant pump density, an extreme taper in the waveguide region along the distance "z" would be required. In other words, a steep slope for the taper would be required over a short distance z along the length of the waveguide region. However in such cases light may leak from the waveguide, depleting the pump or transmission optical fields, and eventually the waveguide could stop guiding light.

Thus, the advantages of achieving a constant value for the pump power density preferably should be balanced against concerns for leakage. Advantageously, an adiabatic taper is used, i.e., one that is sufficiently gradual that the mode is maintained over the waveguide region and scattering losses are negligible. An adiabatic taper may be achieved when the waveguide region is tapered by a few microns for a waveguide length of approximately 1 cm, or more preferably, for a length of a few micron or less. For example, a waveguide having a width at the first pump site of about 10–30 μm may be reduced to a width that is as small as possible while still allowing for the transmission of light, e.g., down to ~1–3 μm. As another example, the width of the waveguide at the first pump site may be within a range of from 2–15 μm and then narrowed down to a smaller width in the range of about 1–3 μm. One skilled in the field will appreciate that the degree of taper preferred for achieving the largest reduction in pump power depletion with smallest losses would depend upon the materials used, the concentration and type of dopants, the length of the waveguide region and pump propagation length, the width of the waveguide region at the first and second pump sites, the pump power, and other factors.

Figure 3:
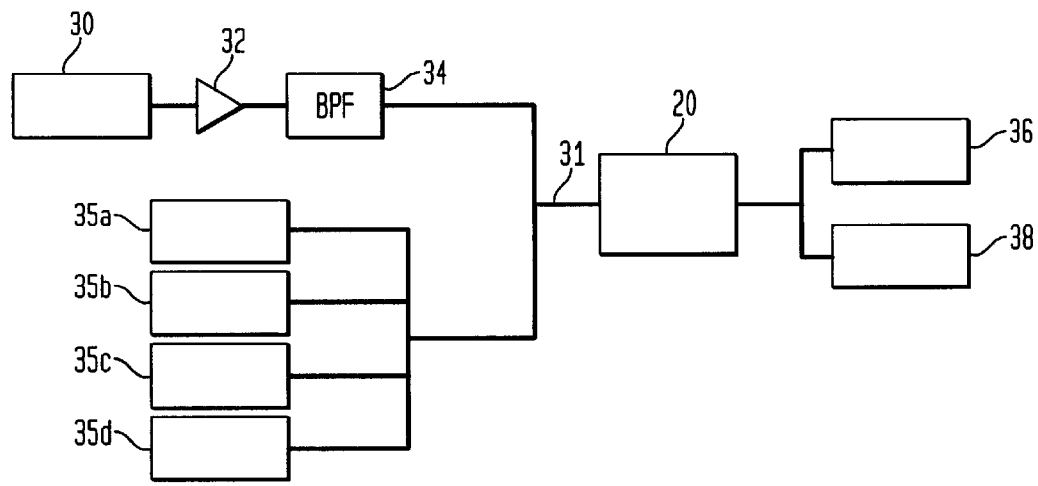
FIG. 3 is a schematic view of one embodiment of the inventive waveguide structure together with pump and signal sources.

FIG. 3 illustrates a schematic diagram of a difference frequency generation (DFG) wavelength converter system in which the inventive waveguide structure may be used. Such systems are described in an article by I. Brener, an inventor herein, and others, titled, "1.5-μm-*Band Wavelength Conversion Based on Cascaded Second Order Nonlinearity in LiNbO₃ Waveguides,*" IEEE PHOTONICS TECH. LETTERS, Vol. 11, No. 6 (June 1999), which is incorporated herein by reference. In this system, a pump laser 30 is an external cavity laser for emitting signals amplified by an erbium-doped fiber amplifier 32, e.g., to a level of ~300 mW, filtered through a bandpass filter 34, and launched into the transmission path 31. The pump light is thus combined with transmission optical fields generated by four different external cavity lasers 35a, 35b, 35c, 35d, and the pump and transmission fields are launched into the waveguide structure 20. The output from the waveguide structure may be fiber coupled and analyzed in an optical spectrum analyzer 36 and power meter 38. With this structure, a simultaneous multi-channel wavelength conversion may be performed with pump power launched into the waveguide. However, in the absence of the inventive waveguide structure the efficiency of the conversion process would be limited by pump depletion. While the conversion efficiency could be improved with higher pump powers and different operating conditions (e.g., use of higher temperatures, or a different selection of dopants or quasi-phase matching grating periods), pump depletion places inherent limits on the process efficiency. Use of the tapered waveguide improves the efficiency which in turn, enhances the flexibility of the system configuration, e.g., the same or greater efficiencies can be achieved while using lower pump powers and/or with fewer constraints on the system design.

Figure 4A:
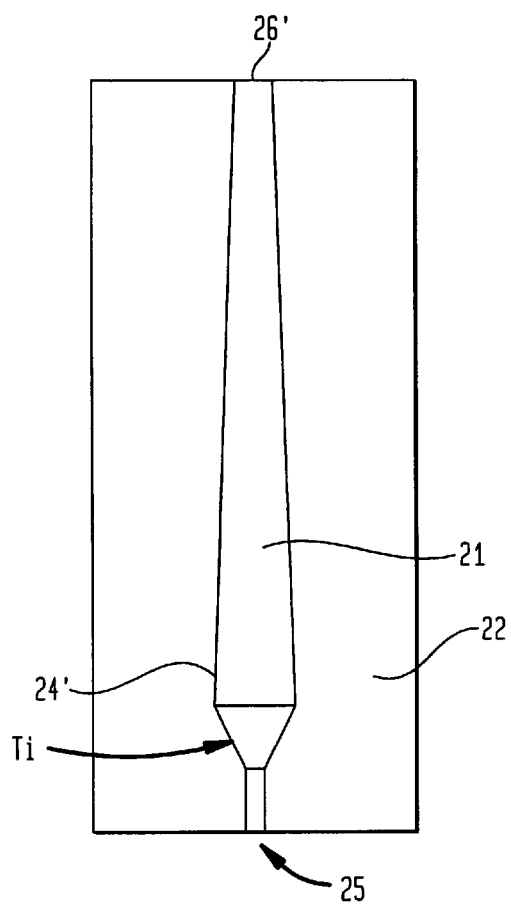
FIGS. 4A and 4B are schematic top plan views of alternative embodiments of the inventive waveguide structure comprising an erbium-doped waveguide amplifier.
Figure 4B:
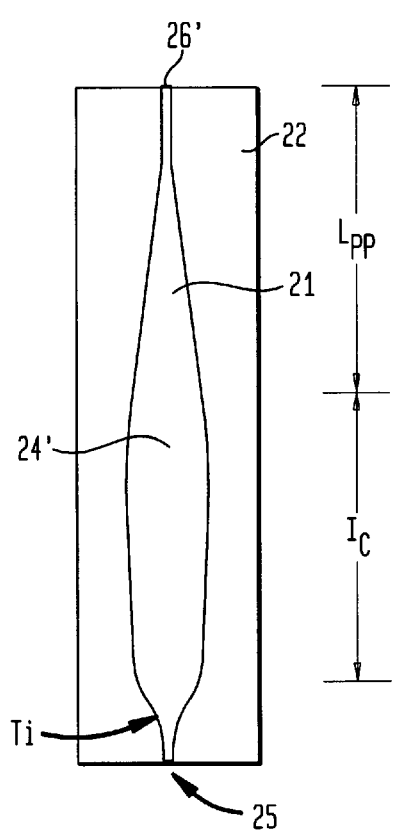

FIGS. 4A and 4B illustrate alternative embodiments of the waveguide structure, i.e., reflecting top plan views of planar waveguide structures comprising an inner waveguide region 21 and a contiguous or second region 22. In these embodiments, there is included an optional initial outward taper $T_i$ at the input of the waveguide, i.e., where the pump and transmission optical fields are introduced into the waveguide. This initial outward taper $T_i$ is advantageous for amplifier applications. In FIG. 4A, given use of the initial outward taper, the first pump site is not shown at the waveguide edge or input 25, but at a point 24' inward of waveguide edge at the end of the initial outward taper. Even if the pump light is combined with the transmission path at the waveguide edge 25, use of the taper beginning at a first pump site 24' inward of the edge is helpful in substantially reducing depletion of pump light, as the depletion in pump light may not become significant or of concern until the pump light has traveled a certain distance within the waveguide. Consequently, a configuration such as illustrated in FIG. 4B may also be advantageous in reducing pump depletion, that is, in FIG. 4B, the waveguide diameter is initially tapered outward for amplification over the initial tapered region Ti, the waveguide diameter is then maintained substantially constant over a certain intermediate waveguide distance IC, and then the waveguide diameter is tapered inward over a section of the waveguide defined herein as the pump propagation length between the first pump site, 24' and the second pump site 26.'

The taper can be optimized depending on the application and optical process. For example, applying the embodiments of FIGS. 4A–4B, in operation both pump and transmission optical fields may be launched together into a single mode region of the waveguide. Then this region may be tapered to the intermediate (or wide gain) region where a different concentration of erbium dopants are introduced. The wide gain region may comprise a single mode or a multimode waveguide. When a multimode waveguide is introduced, the taper at both ends of the fiber advantageously comprises an adiabatic taper, i.e., by "adiabatic" it is meant that the degree of the taper is sufficiently gradual that scattering losses are negligible and the lowest mode of the waveguide is constantly used for transmission. The wide region is important in an amplifier application so that there are sufficient Er atoms to provide optical gain. Because of the adiabatic transition, both pump and signal beams excite the lowest mode of the wide gain region of the waveguide. As the pump beams travel along the waveguide, their power is reduced due to absorption caused by the Er atoms. The absorption ordinarily would lead to an exponential decay of the pump power as a function of the waveguide length. However, the taper introduced at the end of the wide gain region, e.g., at the first pump site 24', counteracts the exponential decay. Again, in the case of the multimode waveguide, the taper advantageously has an adiabatic transition, i.e., the taper can be designed as an exponential taper which is narrow towards the end, as in FIG. 4B, so that the pump power density is kept substantially constant through the length of the multi-mode region. The taper can be in two or three dimensions.

Figure 5A:
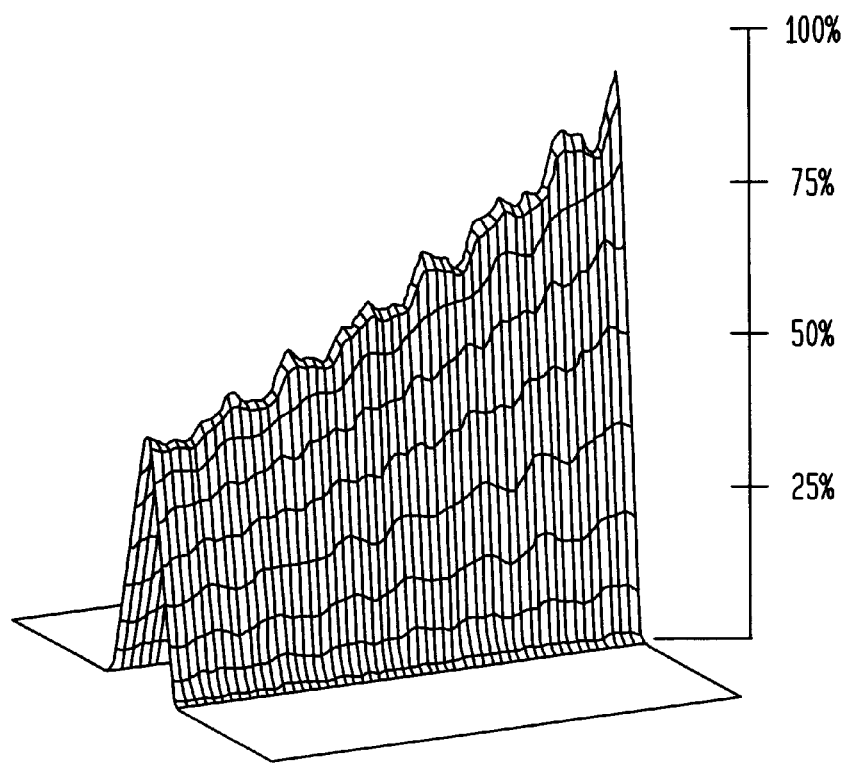
FIG. 5A reflects a pump density profile as a function of propagation distance for an untapered, straight 5-$\mu$m wide Er-doped waveguide having a length of 1 cm.
Figure 5B:
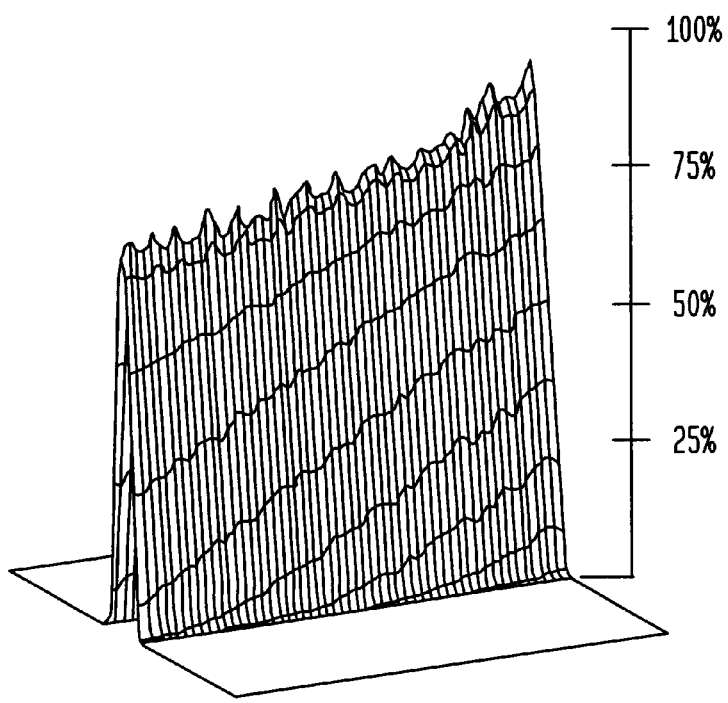
FIG. 5B reflects a pump density profile as a function of propagation distance for the same waveguide as in FIG. 5A, but where a taper has been introduced so that the width of the waveguide is decreased linearly from 5 μm to 2.5 μm.

FIG. 5A reflects a pump density profile as a function of propagation distance for an untapered, straight 5 μm wide Er-doped waveguide having a length of 1 cm; and FIG. 5B reflects the pump density profile for the same waveguide where a taper is introduced. In each case, the wavelength was 980 nm, the core index of refraction is 1.6, and the second index of refraction is 1.45. Notably, in FIG. 5A the pump density profile shows how the absorption in the waveguide depletes the field of the propagating light. If this light is used to pump erbium atoms for gain, it will result in lower gain towards the end of the waveguide. In comparison, in FIG. 5B, a taper has been introduced, wherein the width of the waveguide is decreased linearly from 5 μm to 2.5 μm. As can be seen, the pump brightness decay has been substantially reduced as compared with FIG. 5A. The profile of FIG. 5B reflects a loss of about 3.5 dB/cm, or a loss of less than 25% of the original pump power. As can be seen, the profile of FIG. 5A reflects a loss of more than 50% of the pump power. Any degree of improvement in brightness decay is advantageous.

It is understood that the embodiments described herein are merely exemplary and that a person skilled in the art may make variations and modifications without departing from the spirit and scope of the invention. For example, although the invention is described above with reference to a fiber amplifier, the same concepts can be applied to a waveguide converter or a planar waveguide. A planar optical waveguide amplifier may be used. The waveguide may be fabricated with glass such as sodium calcium silicates or soda lime glasses. $Er^{3+}$ concentrations of up to 2 mole% can be incorporated into these glasses with reasonable lifetimes. The abundance of non-bridging oxygen in soda lime glass allows for higher levels of Er doping without clustering. All such variations and modifications are intended to be included within the scope of the appended claims.

We claim:
1. An article including a waveguide structure for use with a first source for transmission of an optical field and a second pump light for amplification or conversion, the wavelength structure comprising:
   a waveguide region having a first index of refraction;
   a second region having a second index of refraction contiguous the waveguide region, the second index of refraction being lower than the first index of refraction whereby a transmission optical field launched into the waveguide structure from the first source is guided within the waveguide region and pump light launched into the waveguide structure amplifies or converts the transmission optical field;

wherein the waveguide region has a first pump site and a second pump site between which pump light is transmitted within the waveguide region for amplification or conversion to define a pump propagation length, the pump light transmitted from the first pump site to the second pump site and the effective area of the waveguide region is larger at the first pump site than at the second pump site for reducing the decrease in pump power density along the wavelength.

2. The article of claim 1 in which the waveguide region is adiabatically tapered over the pump propagation length.

3. The article of claim 1 further comprising the first source for introducing transmission optical fields to the waveguide structure at a transmission input site.

4. The article of claim 3, wherein the transmission input site and first pump site are located at substantially the same position along the waveguide region.

5. The article of claim 3, wherein the transmission input site and second pump site are located at substantially the same position along the waveguide region.

6. The article of claim 3, wherein the first pump site is located along the waveguide region at a predetermined distance from the transmission input site.

7. The article of claim 6, in which the waveguide region has a first width at the transmission input site and a second width located at a position along the waveguide region, the second width being larger than the first width to define an initial tapered region.

8. The article of claim 7, in which the first pump site is positioned at an end of the initial tapered region distal the transmission input site.

9. The article of claim 1 in which the waveguide structure comprises a planar waveguide.

10. The article of claim 1 in which the waveguide structure comprises an optical fiber.

11. The article of claim 1 comprising a waveguide amplifier.

12. The article of claim 1 comprising a wavelength waveguide conversion device.

13. An assembly for use in amplifying or converting a transmission optical field comprising:

a waveguide structure comprising a waveguide region having a first index of refraction and a second region having a second index of refraction contiguous the waveguide region, the second index of refraction being lower than the first index of refraction, a first source for emitting the transmission optical field to the waveguide structure at a transmission input site, whereby when the transmission optical field is launched into the waveguide structure from the first source, it is guided within the waveguide region;

a second source for launching pump light into the waveguide structure to amplify or convert the transmission optical field;

wherein the waveguide region has a first pump site and a second pump site between which pump light is transmitted within the waveguide region for amplification or conversion to define a pump propagation length, and the effective area of the waveguide region is larger at the first pump site than at the second pump site for reducing the depletion of pump power.

14. The assembly of claim 13 in which the waveguide region is adiabatically tapered over the pump propagation length.

15. The assembly of claim 13 in which the second source launches pump light to the waveguide structure proximal the transmission input site.

16. The assembly of claim 13 in which the second source launches pump light to the waveguide structure distal the transmission input site.

17. An optical communications system including the article of claim 1.

18. An optical communications system including the assembly of claim 13.

* * * * *